Figure 10:
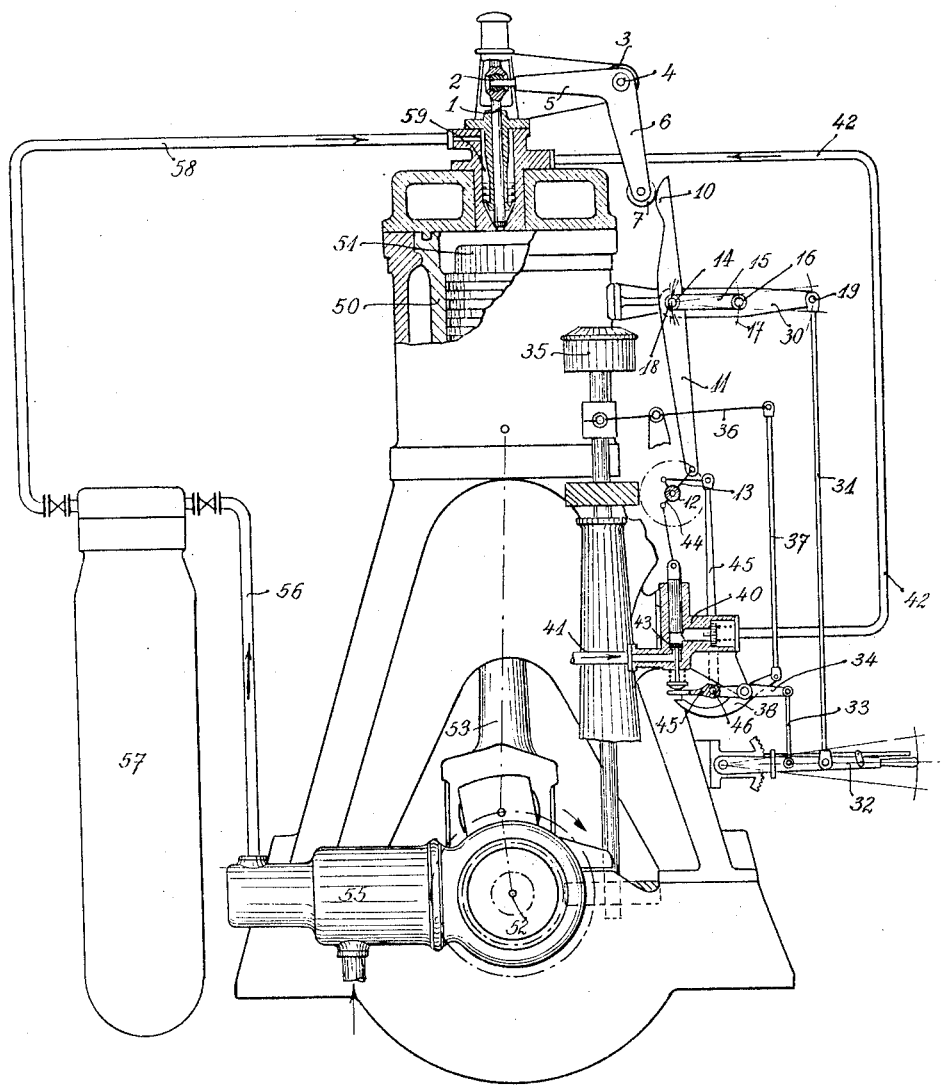

H. JUNKERS.
VALVE GEAR FOR THE INJECTION VALVES OF COMBUSTION POWER ENGINES.
APPLICATION FILED MAR. 19, 1914. RENEWED AUG. 13, 1919.
1,320,063.
Patented Oct. 28, 1919.
3 SHEETS—SHEET 1.
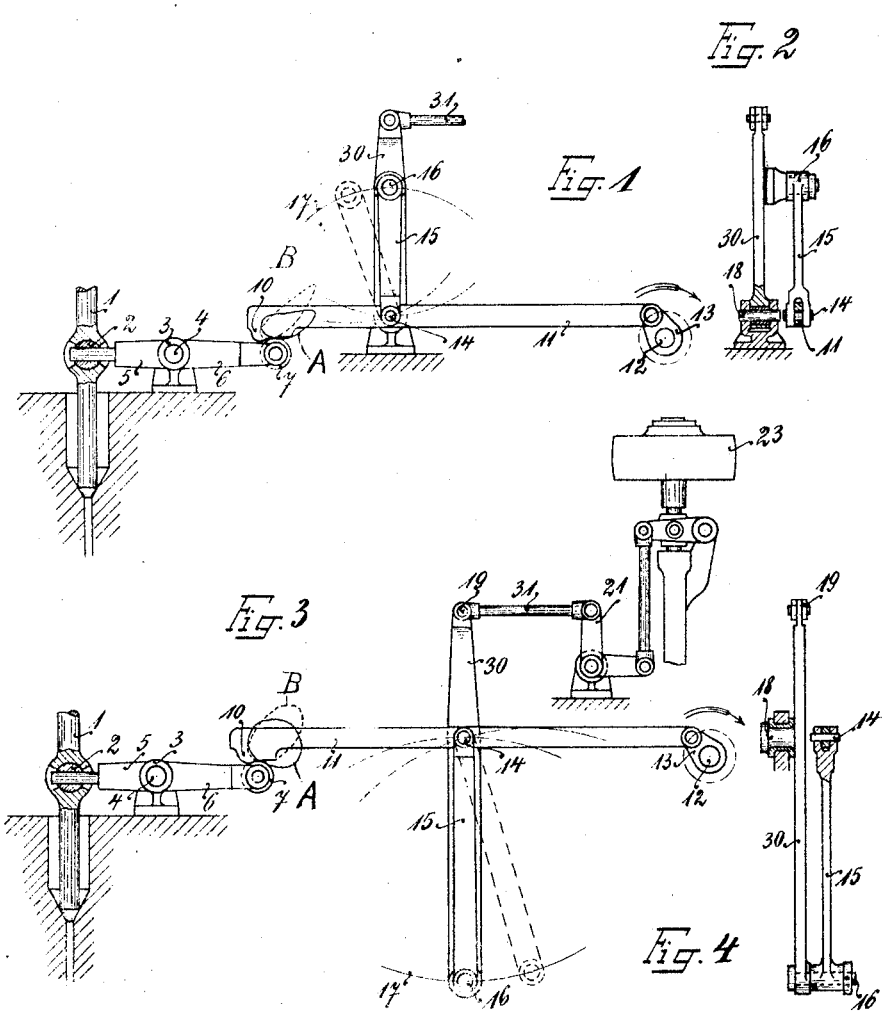
Inventor:
Hugo Junkers H. JUNKERS.
VALVE GEAR FOR THE INJECTION VALVES OF COMBUSTION POWER ENGINES.
APPLICATION FILED MAR. 19, 1914. RENEWED AUG. 13, 1919.
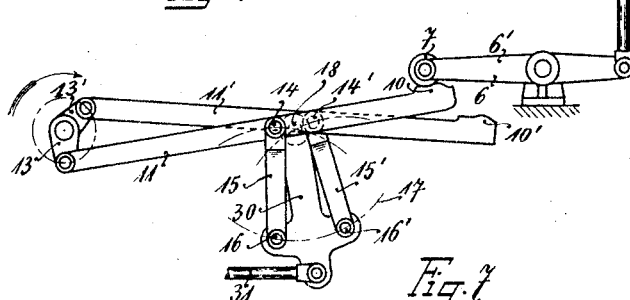
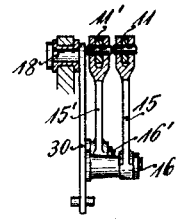
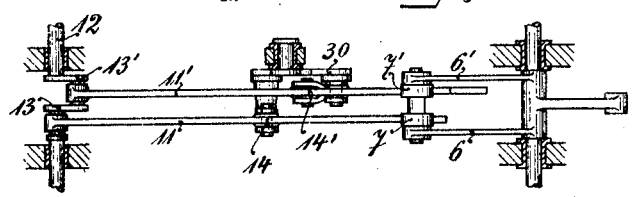
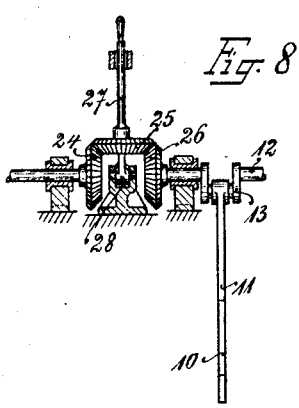
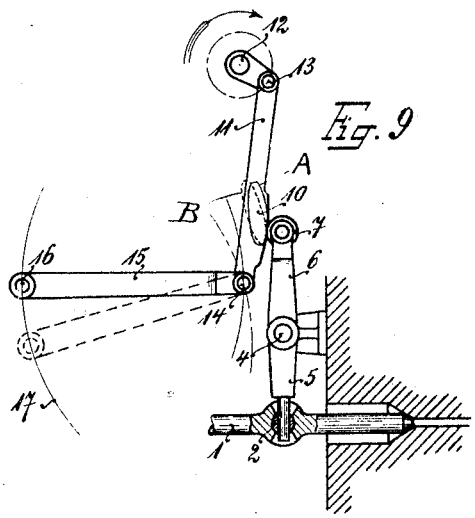
Inventor:
Hugo Junkers,
By

UNITED STATES PATENT OFFICE.

HUGO JUNKERS, OF AACHEN, FRANKENBURG, GERMANY, ASSIGNOR, BY MESNE ASSIGNMENTS, TO L. M. WHEELOCK, OF BOSTON, MASSACHUSETTS.

VALVE-GEAR FOR THE INJECTION-VALVES OF COMBUSTION POWER-ENGINES.

1,320,063.   Specification of Letters Patent.   Patented Oct. 28, 1919.

Application filed March 19, 1914, Serial No. 825,883. Renewed August 13, 1919. Serial No. 317,373.

*To all whom it may concern:*

Be it known that I, HUGO JUNKERS, a subject of the German Emperor, residing at and whose post-office address is Aachen, Frankenburg, Germany, have invented certain new and useful Improvements in Valve-Gear for the Injection-Valves of Combustion Power-Engines, of which the following is a specification.

This invention relates to valve gear for internal combustion engines, adapted particularly for use with slow combustion engines employing fuel in liquid form. The invention is directed to the provision of an improved form of valve gear whereby the distance through which the movable valve-member of the inlet valve is lifted or the time during which that member is held raised from its seat or both may be varied as desired without changing to any substantial degree the point at which the valve is opened relatively to the position of the piston. The invention may be employed in connection with valve gearing wherein the desired changes in the relation of the parts, as for instance to adjust the time during which the valve remains open, may be effected automatically in accordance with changes in the speed of the engine. Also, the invention may be employed in connection with valve gearing adapted for operation of the engine in either direction.

The movements made by the parts of a valve gearing for an internal combustion engine may be classified as the normal operating movements and the governing movements. The normal operating movements are those movements of the parts by which the rotation of the cam-shaft causes the movable member of the inlet valve to be raised from and lowered upon its seat at regular intervals during the operation of the engine shaft. The governing movements of the parts of the valve gearing are those movements which are effected in order to effect changes in the time or extent of the movements of the parts with relation to the engine shaft so that the time during which the fuel is admitted relatively to the rotation of the engine shaft will be changed.

In the operation of slow combustion engines employing liquid fuel, a pump corresponding to each cylinder supplies a measured charge of fuel to the inlet valve of the cylinder for each cycle of operations in that cylinder, and the amount of fuel so pumped to the inlet valve is varied in accordance with the power to be developed. The charge of fuel thus supplied to the inlet valve is forced into the cylinder by high pressure air when the inlet valve is opened. The amount of this high pressure air entering the cylinder on opening of the inlet valve is dependent upon the duration of the time in which the inlet valve is held open or the distance the movable member of the inlet valve is moved from its seat or both. It will be apparent that when the engine is running slowly, the valve will be held open longer and a correspondingly greater amount of compressed air will enter the cylinder. This is objectionable for various reasons, among them being that the excess of compresed air cools the cylinder contents too much and has a detrimental effect upon the combustion, which even without the excess of air would not be at its best when the engine is running slowly.

In accordance with the present invention, these defects are overcome by the provision of means whereby during slow running of the engine, the raising of the valve member of the inlet valve from its seat is diminished, that is, the duration of the time during which the movable valve member is held in the open position or the distance through which the valve member is moved away from its seat and back again or both are diminished. In this way, both the use of an excessive amount of compressed air and the disadvantages resulting therefrom are avoided. Furthermore, while the duration of the period in which the inlet valve is held open is changed as the conditions of operation of the engine are changed, the point in the cycle of operations at which the opening of the valve takes place remains unchanged.

Preferably, the changes in the time during which the movable valve member is held in the open position and in the amount of lift of the member, without affecting the point in the cycle of operations at which the opening of the valve takes place, are affected automatically under the control of a centrifugal device driven by the engine.

The invention will be better understood by reference to the following description taken in connection with the accompanying drawings in which Figure 1 is a view in elevation of a valve gearing constructed in accordance with the present invention; Fig. 2 is an end view thereof, parts being broken away for the sake of clearness; Figs. 3 and 4 are views similar to Figs. 1 and 2 with the addition of automatic governing mechanism; Figs. 5, 6 and 7 are an elevation, a sectional view, and a plan view showing the construction adapted for operating the engine in either direction; Figs. 8 and 9 are views showing a modified construction by which the engine may be operated in either direction; and Fig. 10 is an end view partly in section of an engine equipped with a valve gear constructed in accordance with the preceding figures.

Referring to Figs. 1 and 2 of the drawings, 1 indicates the movable member of the inlet valve of an internal combustion engine employing fuel which is admitted to the cylinder in liquid form. The liquid is forced into the space about the needle 1 and passes into the cylinder when the needle is raised from the conical seat with which the conical end of the needle coacts. The needle or movable valve-member 1 has a swivel bearing which is engaged by a rocking lever 3, one end 5 of which extends within the bearing. This lever 3 is pivotally mounted upon a standard at 4. Its opposite end 6 carries a roller 7 which is engaged by the mechanism for operating the valve.

The roller 7 is shown as engaged by cam 10 on one end of a rocking lever 11 whose opposite end is pivotally connected to an eccentric 13 on the cam-shaft 12. The lever 11 is rocked about its pivotal connection 14 to a rod 15 by which the lever is supported. The rotation of the cam-shaft causes lengthwise reciprocation of the lever 11 and when the lever is so reciprocated its cam 10 engages roller 7 so as to rock lever 3 and actuate the movable valve-member. With a valve-mechanism of this type, governing may be effected by shifting the pivotal connection of the upper end of the rod 15 which supports the lever 11. For this purpose, the upper end of the rod 15 is so supported as to permit of movement of the upper end 16 to any one of a plurality of positions which are substantially concentric with the position of the pivotal connection 14 of the rod 15 and lever 11 at the time when the opening movement of the valve-member begins. As shown, the upper end of the lever 15 is pivotally mounted upon a lever 30 whose lower end is pivotally mounted at 18 upon a suitable support in alinement with the pivotal connection 14 of the rod 15 and lever 11. The two pivotal connections 14 and 18, may be in exact alinement or they may be slightly displaced, the latter arrangement being preferred so as to provide for a slight separation of the cam 10 and roller 7 when the pin 16 has been moved to a position for discontinuing the operation of lever 6 by cam 10, thus insuring against the possibility of having the valve raised a minute distance from its seat and allowing the escape of compressed air into the cylinder.

Fig. 1 shows the parts in full lines, just as the opening movement of the needle 1 is about to begin. Further rotation of eccentric 13 causes movement of lever 11 to the right and cam 10 actuates the lever 3 so as to raise the needle 1. The parts are so mounted that the lower pivoted end 18 of the lever 30 is in substantial alinement with the pivot 14 of the rod 15 when the parts are in the relation shown in Fig. 1. This being so, it will be seen that the lever 30 may be moved about the pivot 18 carrying the upper end 16 of the rod 15 with it over the path indicated at 17 in Fig. 1 without altering the position of the lever 11 in any substantial degree. As a result of this, the rod 15 may be moved to any one of its several positions, as indicated in dotted lines, and whatever its positions, the opening of the inlet valve will occur at the same point in the rotation of the eccentric 13. Such movement of rod 15 to a new position serves to vary the duration of the time during which the inlet valve will be held open, but by reason of the arrangement of the lever 30 for supporting the upper end of rod 15 as above described, such movement of the rod 15 to a new position will not affect the time of starting the opening movement of the inlet valve relatively to the rotation of the engine shaft or the position of the piston within the cylinder.

The curve A indicates the path of movement described by a point on the cam 10 when the rod 15 occupies the position shown in full lines, and the curve B indicates the path of movement of the same point when the rod 15 occupies the position shown in dotted lines.

Figs. 3 and 4 show a construction which is of special utility in connection with engines adapted for operation at a speed which may be changed between wide limits. With this construction, the angular position of the rod 15 which supports the lever 11 may be changed automatically by devices whose position is changed in accordance with the speed of the engine; these devices are not employed for governing the speed of the engine but for adapting the valve gear to the speed at which the engine is caused to run by other devices. In Fig. 3, the rod 15 is shown as depending from the lever 11 and its end 16 is connected to a lever 30 which is pivotally mounted at 18. The upper end 19 of this lever is connected by a link 31 to a bell crank lever 21 arranged to be rocked about its pivot by means of a centrifugal governor 23 actuated by the engine; as the lever 21 is so rocked, it actuates the lever 30 which governs the position of the end 16 of the rod 15. Changing the position of rod 15 thus changes the duration of the time during which the inlet valve is held open as above described but does not change the time when the inlet valve is opened relatively to the rotation of the engine shaft.

In the construction shown in Figs. 5, 6 and 7, provision is made for operating the engine in either direction. For this purpose, either of two cams 10 and 10' may be employed and the rocking levers which carry these cams are connected to the camshaft by means of cranks 13 and 13' which are so positioned upon the shaft as to cause the admission of the combustible fluid to the cylinder at the proper times during either forward or reverse running. The rods 15 and 15' which are connected to the levers 11 and 11' are simultaneously shifted by the movement of the lever 30. By this construction therefore, the movement of a single lever suffices to adjust the parts for operation of the engine in either the forward or the reverse direction and the characteristics of the movement of the movable member of the valve may be made the same for both directions of operation of the engine.

Figs. 8 and 9 show a modified construction for operating the engine in the forward and reverse directions. In Fig. 9, the cam 10 is moved lengthwise to actuate the roller 7, the lever 5 and the movable valve-member. With such a construction, it is only necessary to change the position of the cam-shaft 12 relatively to the engine shaft in order to adapt the mechanism for operation in the reverse direction. This may be done by means of the gearing shown in Fig. 8 involving the division of the cam-shaft into two parts which are connected by a differential gear consisting of bevel gears 24 and 26 on the two sections of the cam-shaft connected by an intermediate bevel gear 25 carried by a lever 27 which is rotatable about the axis of the cam-shaft. By turning the lever 27 while the engine shaft is stationary, the section of the cam-shaft which actuates the valve gearing may be advanced or retarded relatively to the other section of the shaft the amount necessary for operation in the reverse direction.

Fig. 10 shows a valve mechanism of the type above described applied to an internal combustion engine operated with liquid fuel. In this figure, the cylinder is shown at 50 having a piston 51 reciprocating therein and connected by a connecting rod 53 to the crank shaft 52. This shaft operates the movable member of an air compressor 55, which supplies compressed air through a pipe 56 to a storage receptacle 57 from which the compressed air flows through a pipe 58 to the chamber 59 of the inlet valve from which the fuel is forced by the air into the cylinder when the needle 1 of the valve is raised. The liquid fuel is supplied through a pipe 41 to the casing of a pump 40 from which the oil is forced through the pipe 42 to the chamber 59 of the valve. The plunger of the pump 40 is operated by a crank 44 on the valve gear shaft 12 which is suitably geared to the engine shaft. The quantity of the liquid fuel which is supplied to the inlet valve in each operation of the engine is controlled by the suction valve 43 of the pump 40. This valve is shown as operated by a bell crank lever 45 connected to a crank on the shaft 12. The pivot of the lever 45 is carried by a pivoted lever 34 connected by a link 33 to a manually actuated lever 32. This lever 32 is also connected by the link 31 to the lever 30 which is pivoted at 18 and to which the lever 15 is pivoted at 16, in accordance with the construction illustrated in Figs. 1 and 2. By shifting the position of the lever 32, the pivot of the bell crank lever 45 through which the suction valve 43 of the pump is operated may be changed as desired, thereby regulating the charges of fuel supplied to the engine by varying the movement of the suction valve 43 of the pump. Simultaneously with thus regulating the charges of liquid fuel, the point 16 of support of the lever 15 upon which the lever 11 rocks is changed about the axis 14 of the connection between the parts 11 and 15. In this way, the throw of the needle 1 of the inlet valve, that is, the range through which the needle is moved to open and close the valve, is regulated simultaneously with and corresponding to changes in the amount of fuel supplied to the valve in each operation of the engine shaft, the range of movement of the needle 1 being increased as the charges of fuel are increased and vice versa. In all cases, however, the time when the needle 1 begins its opening movement relatively to the rotation of the crank shaft remains unchanged.

In Fig. 10, the parts are shown in the positions they occupy when the needle 1 is about to begin its opening movement, the piston 51 being at or close to its dead center position. At this time, the point 14 of connection between the levers 15 and 11 is in the axis 18 about which the lever 30 turns.

Fig. 10 also includes a safety device of a form which is commonly employed in engines of the type illustrated. A centrifugal device 35 connected to the engine shaft operates through the links 36 and 37 to turn a pivoted lever 38 so as to carry its free end into engagement with the stem of the suction valve 43. If the speed of rotation of the engine shaft were excessive, these parts would operate to hold the suction valve open continuously and thus prevent fuel from being supplied to the engine.

What I claim is:

1. A valve gear for an internal combustion engine comprising the combination of an inlet valve, a source of supply of compressed air connected thereto, an engine-driven pump connected to the inlet valve for supplying a measured charge of liquid fuel to the inlet valve in each cycle of operations of the engine, a valve member in the inlet valve controlling the injection of the measured charge of liquid fuel into the cylinder of the engine by the compressed air, means actuated by the engine for operating the valve member of the inlet valve in each cycle of operations, and means for changing the amount of the measured charge of liquid fuel supplied to the inlet valve in each cycle of operations and for simultaneously adjusting the opening movement of the valve member of the inlet valve without varying the point at which the said valve member is moved to the position for opening the valve relatively to the rotation of the engine shaft; substantially as described.

2. A valve gear for an internal combustion engine comprising the combination of an inlet valve, a source of supply of compressed air connected thereto, an engine-driven pump connected to the inlet valve for supplying a measured charge of liquid fuel to the inlet valve in each cycle of operations of the engine, a valve member in the inlet valve controlling the injection of the measured charge of liquid fuel into the cylinder of the engine by the compressed air, means actuated by the engine for operating the valve member of the inlet valve in each cycle of operations, and means for effecting an adjustment of the quantity of the liquid fuel in the charge supplied to the inlet valve in each cycle of operations of the engine and for simultaneously varying the time during which the movable valve member is held in the open position and the distance it is moved from its seat in each cycle of operations of the engine without varying the point at which the valve member is moved to the position for opening the valve relatively to the rotation of the engine shaft; substantially as described.

3. A valve gear for an internal combustion engine comprising the combination of an inlet valve, a movable valve-member therein, a pivoted valve-actuating lever connected to the valve-member, a rocking lever coacting at one end with said lever to actuate the same, means connected to the other end of said rocking lever for rocking the latter in accordance with the rotation of the engine shaft, a rod having one end pivotally connected to said rocking lever and supporting the latter during the rocking movement thereof and means for moving the opposite end of said rod to regulate the rocking movement of said rocking lever so as to vary the time during which the valve-member is held in the open position without varying the point at which the valve-member is moved to the open position relatively to the rotation of the engine shaft; substantially as described.

4. A valve gear for an internal combustion engine comprising the combination of an inlet valve, a movable valve-member therein, a pivoted valve actuating lever connected to the valve-member, a rocking lever coacting at one end with said lever, means connected to the other end of the rocking lever for rocking the same in accordance with the rotation of the engine shaft, a rod having one end pivotally connected to the rocking lever and supporting the latter, and means for moving the opposite end of said rod to any one of a plurality of positions substantially concentric with the position of the pivotal connection of the rod and said rocking lever at the time when the opening movement of the valve-member begins; substantially as described.

5. A valve gear for an internal combustion engine comprising the combination of an inlet valve, a movable valve-member therein, a pivoted valve actuating lever connected to the valve-member, a rocking lever coacting at one end with said lever, means connected to the other end of the rocking lever for rocking the same in accordance with the rotation of the engine shaft, a rod having one end pivotally connected to the rocking lever and supporting the latter, and means for moving the opposite end of said rod to any one of a plurality of positions substantially concentric with the position of the pivotal connection of the rod and said rocking lever at the time when the opening movement of the valve-member begins, said moving means being actuated automatically in accordance with the speed of rotation of the engine shaft; substantially as described.

6. A valve gear for an internal combustion engine adapted to operate in either direction comprising the combination of an inlet valve, two mechanisms for actuating the movable member of the valve to admit fuel to the cylinder of the engine, means for rendering either of said mechanisms operative and the other inoperative, and means for varying the time during which the movable valve-member is held in the open position without varying the point at which the valve is opened relatively to the rotation of the engine shaft; substantially as described.

7. A valve gear for an internal combustion engine comprising the combination of an inlet valve, a needle therein controlling the valve, two rocking levers for moving the said needle to and holding it in open position, means for rendering either of said levers operative and the other inoperative, mechanism for operating said levers in accordance with the rotation of the engine shaft, and governing mechanism for regulating the actuation of said needle by either of said levers to vary the time during which the needle is held in the position for opening the valve without substantially varying the point at which the needle is moved to the position for opening the valve relatively to the rotation of the engine shaft; substantially as described.

8. A valve gear for an internal combustion engine comprising the combination of an inlet valve, a movable valve-member therein, two rocking levers either of which is adapted to actuate said valve-member, means connected to said levers for rocking them in accordance with the rotation of the engine shaft, two rods each connected at one end to one of the rocking levers and supporting the latter, a support for the other ends of said rods, and means for moving the said support to any one of a plurality of positions angularly about an axis which is substantially coincident with the points of connection of said rods to said levers at the time when the opening movement of the valve-member begins; substantially as described.

9. A valve gear for an internal combustion engine comprising the combination of an inlet valve provided with a movable valve member and a space about the valve member to which the charge of liquid fuel is supplied and from which the charge is injected into the cylinder by compressed air, a source of supply of compressed air connected to said space, means operated by the engine for supplying a measured charge of liquid fuel to said space in each cycle of operations of the engine, means actuated by the engine in each cycle of operations for actuating the valve member of the inlet valve to open the valve and thus allow the charge of fuel therein to be forced into the cylinder, and means for changing the quantity of liquid fuel supplied to the inlet valve in each cycle of operations of the engine and for simultaneously adjusting the opening movement of the valve member of the inlet valve without varying the point at which the valve member is moved to the position for opening the valve relatively to the rotation of the engine shaft; substantially as described.

In testimony whereof I affix my signature in presence of two witnesses.

HUGO JUNKERS.

Witnesses:
  LEO A. BERGHOLZ,
  PAUL ARRAS.

Copies of this patent may be obtained for five cents each, by addressing the "Commissioner of Patents. Washington, D. C."